Nov. 30, 1965  E. GREENO  3,220,453

LOCK NUTS

Filed Feb. 11, 1963

Inventor
Edward Greeno
By Cushman, Darby Cushman
Attorneys

3,220,453
LOCK NUTS
Edward Greeno, 44–46 Fairfield St., London, England
Filed Feb. 11, 1963, Ser. No. 257,640
Claims priority, application Great Britain, Feb. 13, 1962, 5,566/62
2 Claims. (Cl. 151—7)

This invention relates to lock nuts.

In accordance with the invention there is provided a lock nut comprising a nut body having at its working end, an axially extending portion formed at its outer periphery for keyed engagement with a ring or deformable material possessing some resiliency, which ring is moulded into the axially extending portion of the nut body and which provides a work engaging surface at the working end of the nut, the arrangement being such that upon tightening of the nut along a screw-threaded member onto the work, the ring is deformed by axial and radial pressures into locking engagement with the screw-threaded member to lock the nut against undesired loosening.

Figure 1:
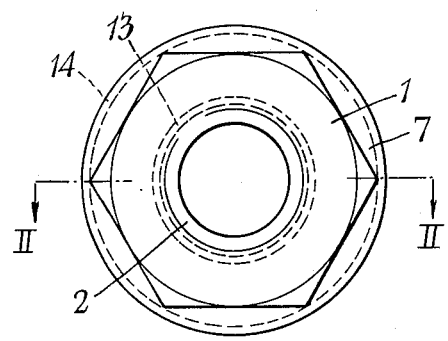
Figure 2:
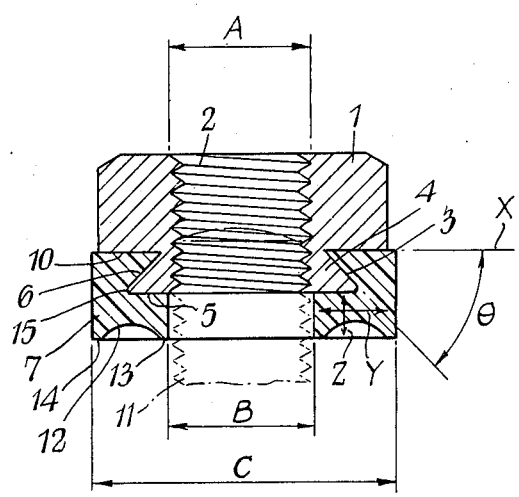

For a better understanding of the invention and to show how it may be carried into effect, the same will now be described, by way of example, with reference to the accompanying drawing, in which:

FIGURE 1 is a plan view of a lock nut according to one embodiment of the invention, and FIGURE 2 is an axial sectional view taken along the line II—II of FIGURE 1.

Referring to the drawing, the locknut illustrated comprises a hexagonal nut body 1 formed with an internally screw-threaded bore 2 and having at its work engaging end (herein referred to generally as the "working end") a dove-tail shaped peripheral recess 3. This recess 3 defines at the working end of the nut body, an axially extending spigot portion 4 which presents a flat circularly extending end face 5 disposed in a plane perpendicular to the axis of the nut body. The spigot portion 4 has an outer peripheral edge face 6, which in the illustrated embodiment, is inclined at an angle $\theta$ of 45° with respect to a plane designated X parallel to the end face 5 and containing the end face 10 of the recess 3.

The nut body has, at its working end, locking means including a hard yet deformable flat ring-like element 7 possessing a certain amount of resiliency and formed of a synthetic plastic material. The ring 7 is produced by being moulded directly onto the nut body. In the present embodiment, the ring 7 is moulded of an acetal resin, such as that known under the Trademark Delrin, having an average deformation of 0.5% under a load of 2,000 lbs. per square inch at 50° C., an average deformation of 1% at a compressive stress of 5,200 lbs. per square inch and an average deformation of 10% at a compressive stress of 18,000 lbs. per square inch. In addition, average figures obtained from fatigue endurance tests, show that the material will withstand without failure a stress of 5,000 lbs. per square inch applied at a temperature of 70° F. and 50–100% RH, at a rate of 1,800 times per minute to 1 million cycles.

In the normal unstressed condition of the ring 7, the ring has an outer diameter C slightly greater than the distance between two diametrically opposite points of the nut body, and an inner diameter B which is slightly greater than the maximum crest or nominal diameter A of the screw-threaded member 11 to be engaged by the nut.

Although the material of the locking ring 7 is hard, it is deformable so that, when the nut is tightened, the material is compressed axially between the work and the nut body and the material is also squeezed radially.

There is thus produced, upon tightening of the nut, radial pressure, as indicated by the arrow Y, and axial pressure, as indicated by the arrow Z, in such a manner that material of the ring 7 is urged radially inwardly into the helical space or groove between the "crests" of the screw-threaded member 11. The resilient nature of the material is such that, upon tightening of the nut, the ring 7 can be urged into tight frictional and liquid sealing engagement not only with the working end of the nut and the opposed face of the work, but also with the screw-thread of member 11, thereby to lock the nut against undesired loosening.

The inclined or dove-tailed formation of the axially extending portion 4 of the nut body is such as to provide an adequate anchorage for securing the ring 7 to the nut body. The angle $\theta$ of the inclined edge face 6 of the recess 3 may be between about 30° and 60°, but is preferably 45° as shown in FIGURE 2, to hold the ring in position.

The working face of the ring element 7 is formed with a circularly extending groove 12 which is of arcuate shape in cross-section. This groove defines adjacent the inner and outer peripheries of the ring element, reduced portions 13 and 14 respectively which facilitate the resilient deformation of the ring into engagement with the screw-threaded member 11.

The peripheral edge 15 defined at the working end of the nut by the inclined edge face 6 of the recess and the end face 5 of portion 4, is of grounded configuration to prevent the periphery of portion 4 cutting into the ring element 7 during a nut-tightening operation.

If desired, the peripheral face 6 of the spigot portion 4 may be of other formation; for example, it may be provided with projections, or formed with a peripheral rib, to provide a key for the ring 7. The dove-tailed arrangement illustrated in the drawings has the advantage that the inclined edge face 6 serves not only to hold the ring on the nut body but also to permit the nut body to be rotated relatively to the ring during a tightening operation.

It is found that the acetal resin known under the Trademark Delrin is sufficiently hard yet resilient to provide the desired locking effect upon tightening of the nut. The material is also sufficiently deformable to enable it to be extruded into the helical space or groove of the screw-threaded element 11. Thus, the lock nut provides not only a satisfactory locking action but also enables an effective liquid-tight seal to be obtained between the nut body and the cooperating bolt or other screw-threaded element of an assembly.

The ring element is formed by being moulded directly onto the end of the nut body, this being effected by means of a high-pressure injection moulding operation. For this purpose, there are provided cooperating mould members formed with moulding recesses adapted to receive a plurality of the nut bodies onto which the rings are to be moulded. Each ring so produced constitutes effectively an integral part of the associated nut body to form a unit. This has the advantage that a considerable saving of time can be achieved when using the unitary lock nuts in assembly work, in that the separate operations of placing conventional locking nuts and washers on a screw-threaded member, are obviated. Moreover, the lock nuts are particularly suitable for use with automatic tightening mechanism. By making the bore of the ring 7 a little greater than the nominal diameter of the thread in the nut body, the ring facilitates the engagement of the lock nut over the screw, spindle or the like onto which it is to be screwed and provides a lead for aligning the nut with the screw. The arrangement is also such that the locking ring carried by the nut body will pass freely over the threaded element until the ring is deformed upon tightening of the nut body onto the work.

The moulding material of which the locking rings are formed can conveniently be colored according to a code, to indicate the material of the nut body. For example, a red ring may indicate that the associated nut is formed of brass, a black ring may indicate a nut of mild steel, blue may indicate stainless steel while green may indicate aluminium. This colour code is of particular use where the nuts are plated or otherwise coated and the material of which the nut is made cannot readily be ascertained.

I claim:

1. A lock-nut for use with a screw-threaded member to engage a workpiece at the working end of the nut to thereby provide a locking action for the nut with respect to the screw-threaded member comprising: a nut-body, an axial extension at one end of said nut body, said axial extension being formed by a peripheral recess formed in and extending about said nut-body, said recess defining an extension formation which is of dovetailed configuration and which provides the nut-body with a first flat end face disposed at the working end of the nut-body and perpendicular to the axis thereof, a second flat end face spaced axially inwardly from and parallel to said first flat end face, and a peripheral edge extending about said extension formation and inclined in a direction radially outwardly and towards the working end of said nut, said nut-body and said axial extension having a bore extending therethrough, said nut-body being internally threaded within said bore; a ring of acetal resin moulded directly on and secured to said axial extension, said resin having an average deformation of 0.5% under a load of 2,000 lbs. per square inch at 50° C., an average deformation of 1% at a compressive stress of 5,200 lbs. per square inch and an average deformation of 10% at a compressive stress of 18,000 lbs. per square inch; said ring having an axial bore, the bore of said ring being greater in diameter than the external diameter of the screw-threaded element, said ring further being provided with a first portion disposed in said peripheral recess and engaging said second flat end face, a second portion integral with said first portion and protruding from said first flat end face of the nut-body, said second portion of said ring being provided with a work-engaging surface for engagement with the work when said lock-nut is tightened along the screw-threaded member, said work-engaging surface of said ring being provided with a circularly extending groove which is arcuate in cross-section.

2. A lock-nut as claimed in claim 1, wherein said ring is formed of material injection moulded directly on said axial extension.

References Cited by the Examiner

UNITED STATES PATENTS

| | | | |
|---|---|---|---|
| 2,678,585 | 5/1954 | Ellis | 151—38 |
| 2,756,795 | 7/1956 | Clingman | 151—38 |
| 2,761,349 | 9/1956 | Heller | 151—38 |
| 2,870,812 | 1/1959 | Heller | 151—38 |
| 2,943,661 | 7/1960 | Stern | 151—38 |

FOREIGN PATENTS

| | | |
|---|---|---|
| 24,781 | 10/1922 | France. |
| 1,315 | 2/1901 | Great Britain. |

EDWARD C. ALLEN, *Primary Examiner.*